US011005929B1

(12) United States Patent
Chamarajanagar et al.

(10) Patent No.: US 11,005,929 B1
(45) Date of Patent: May 11, 2021

(54) DYNAMIC DATA CENTER LOAD BALANCING USING BORDER GATEWAY PROTOCOL

(71) Applicant: Cisco Technology, Inc., San Jose, CA (US)

(72) Inventors: Sanjay Viswanatha Chamarajanagar, Bangalore (IN); Sanjeev Maheve, Bangalore (IN); Georgekutty Thekkel Jose, Idukki (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 150 days.

(21) Appl. No.: 16/261,778

(22) Filed: Jan. 30, 2019

(51) Int. Cl.
*H04L 29/08* (2006.01)
*H04L 12/66* (2006.01)
*H04L 29/12* (2006.01)

(52) U.S. Cl.
CPC ............ *H04L 67/104* (2013.01); *H04L 12/66* (2013.01); *H04L 61/1511* (2013.01); *H04L 61/2007* (2013.01)

(58) Field of Classification Search
CPC ... H04L 61/1511; H04L 67/104; H04L 12/66; H04L 61/2007
See application file for complete search history.

(56) References Cited

U.S. PATENT DOCUMENTS

| | | | |
|---|---|---|---|
| 7,111,061 B2 | 9/2006 | Leighton et al. | |
| 7,609,619 B2 | 10/2009 | Naseh et al. | |
| 8,073,953 B2 | 12/2011 | Christian et al. | |
| 8,243,589 B1 | 8/2012 | Trost et al. | |
| 8,745,177 B1 | 6/2014 | Kazerani et al. | |
| 9,560,124 B2 | 1/2017 | Eisenbud et al. | |
| 2006/0193252 A1 | 8/2006 | Naseh et al. | |
| 2016/0315857 A1 | 10/2016 | Lubashev et al. | |
| 2018/0121475 A1* | 5/2018 | Asbi | G06Q 10/06 |
| 2018/0205634 A1* | 7/2018 | Avci | H04L 45/24 |

* cited by examiner

*Primary Examiner* — Justin T Van Roie
(74) *Attorney, Agent, or Firm* — Edell, Shapiro & Finnan, LLC

(57) ABSTRACT

Techniques for dynamic data center load balancing using Border Gateway Protocol (BGP) are described. In one embodiment, a method includes monitoring a load on a first data center by a Domain Name System (DNS) server, where the first data center shares a same Internet Protocol (IP) address with at least a second data center. Upon determining that the load on the first data center exceeds a threshold, the method includes changing weights associated with BGP routes to servers of the first data center to be smaller than weights associated with BGP routes to servers of the second data center. The method also includes advertising, by an edge router, the BGP routes to servers of the second data center and, upon receiving a new connection request from a user, connecting the user to a server of the second data center based on an advertised BGP route.

20 Claims, 8 Drawing Sheets

DYNAMIC DATA CENTER LOAD BALANCING USING BORDER GATEWAY PROTOCOL

TECHNICAL FIELD

This disclosure relates generally to load balancing between data centers in a computer network.

BACKGROUND

Data centers store information and provide global access to the information and application software through a plurality of computer resources. Data centers may also include automated systems to monitor server activity, network traffic and performance. A typical data center houses various computer resources, including servers or hosts, load balancers, routers, switches, etc. that execute various operating systems and application software, storage subsystems and network infrastructure.

A distributed data center is one that locates computer resources at different geographically-separated data centers. The use of multiple data centers provides critical redundancy, business continuity, disaster recovery, and load-sharing solutions. One type of distributed data center topology comprises at least a pair of data centers, both of which are active, with traffic typically going to the nearest active data center. Some distributed data centers use Domain Name System (DNS) for managing business continuance and load sharing between the multiple data centers.

DESCRIPTION OF EXAMPLE EMBODIMENTS

Overview

Figure 1:
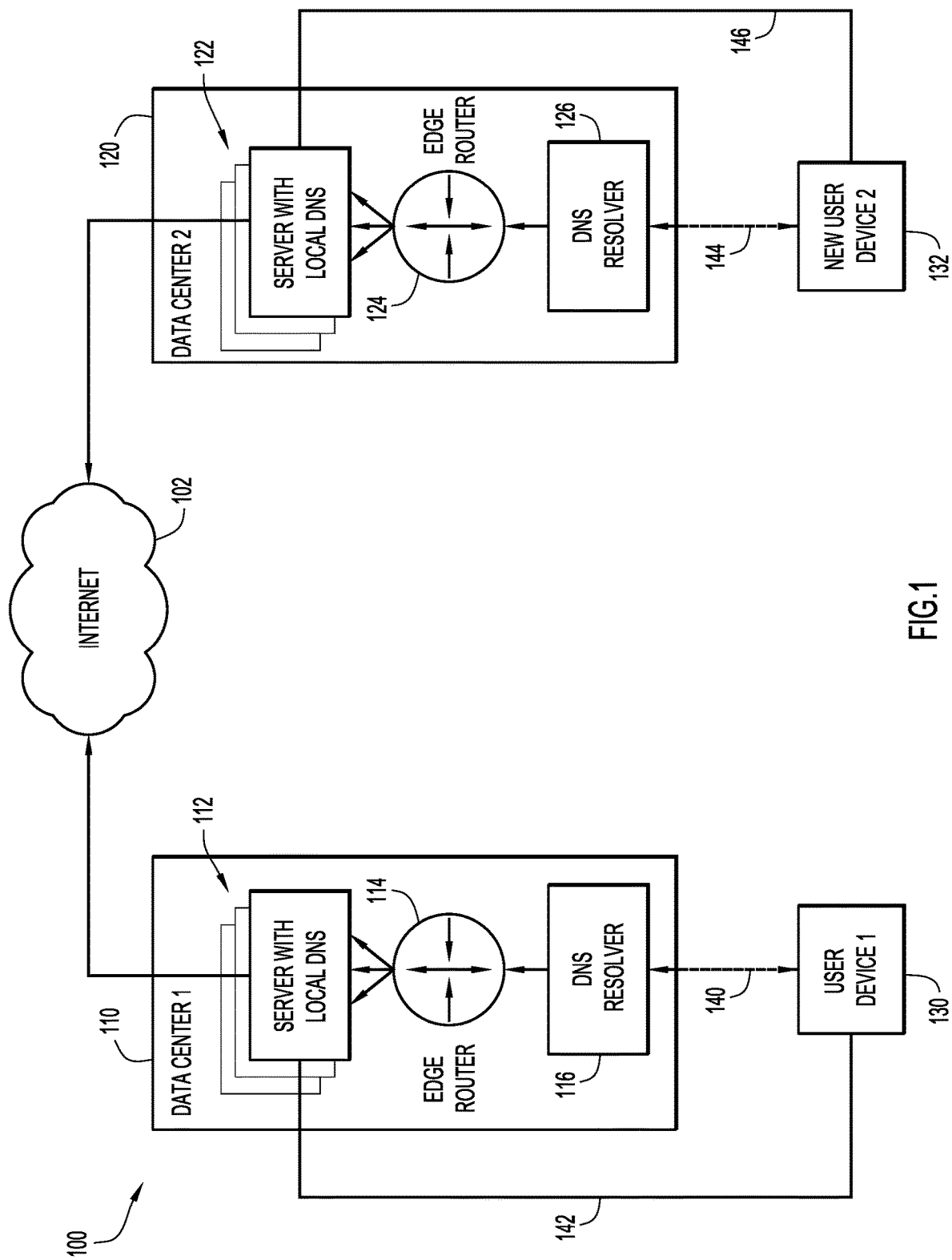
FIG. 1 is a diagram illustrating a network in which techniques for dynamic data center load balancing using Border Gateway Protocol (BGP) may be implemented, according to an example embodiment.

Presented herein are techniques for dynamic data center load balancing using Border Gateway Protocol (BGP) in a network. In an example embodiment, a method includes monitoring, by a Domain Name System (DNS) server at a first data center comprising a first plurality of servers, a load on the first data center. The first data center shares a same Internet Protocol (IP) address with at least a second data center comprising a second plurality of servers. The first data center and the second data center are located in different geographic locations. Upon determining that the load on the first data center exceeds a threshold, the method includes changing weights associated with BGP routes to servers of the first plurality of servers to be smaller than weights associated with BGP routes to servers of the second plurality of servers. The method also includes advertising, by an edge router at the first data center, the BGP routes to servers of the second plurality of servers of the second data center that have a greater weight than the BGP routes to servers of the first plurality of servers of the first data center. Upon receiving a new connection request from a user for a connection to the same IP address for the first data center and the second data center, the method includes connecting the user to a server of the second plurality of servers of the second data center based on an advertised BGP route from the edge router.

EXAMPLE EMBODIMENTS

Anycast is a network addressing and routing methodology in which a single destination address has multiple routing paths to two or more endpoint destinations. In a conventional Anycast-based system, when a client computer attempts to setup a virtual private network (VPN) connection with a remote cloud service (e.g., a data center), either in full tunnel mode or selective tunnel mode using a fully qualified domain name, the client computer sends a Domain Name System (DNS) query to a DNS resolver to get the Internet Protocol (IP) address for the data center. The DNS resolver contains the Name Service (NS) record for the requested fully qualified domain name with an Anycast IP address.

Border Gateway Protocol (BGP) is routing protocol that manages routing traffic across networks through the exchange of routing and availability information between edge routers. BGP makes routing decisions based on paths, rules or network policies configured by a network administrator. Using Anycast, a collection of servers across multiple data centers can share the same Anycast IP address. Because Anycast is linked to BGP, the DNS query resolves to one of the nearest data centers (i.e., based on the routing information from BGP). Within the data center, there are online servers that hold a public (or a unicast) IP address and a common Anycast IP address. All of the online servers at the data center advertise a route to the Anycast IP address to an edge router of the data center, either via equal or unequal BGP weights. Once the DNS query is received by the server, the server returns an address record (i.e., 'A' record) with its unicast IP address. This IP address may be used by the client computer to send data traffic or a connection request. Because of the combination of Anycast and BGP, the data traffic or connection request from the client computer will always be directed to the data center that is topographically the closest to the client computer.

The conventional Anycast-based system, however, presents several inherent problems. First, client data traffic will keep being routed to the same topographically-closest data center, irrespective of load on the online servers at that data center, as long as there is at least one server advertising a route to the edge router in that data center. As a result, even if the next nearest data center has better available capacity, it will not be effectively leveraged in this scenario. Second, in cases where VPN connectivity is being provided by a service at the data center, the client connection latency increases exponentially as servers at the data center become fully loaded over a period of time. Additionally, conventional Anycast-based systems are not able to fully utilize the computing power of heterogeneous server configurations (e.g. 16/24/32 cores) within a data center. Data center to data center failover is challenging, which often requires human intervention. As a result, these problems can result in capacity over planning for conventional data centers.

The techniques for dynamic data center load balancing using BGP in a network presented herein provide a solution to effectively share loads across multiple data centers without compromising advantages of the abilities and benefits of Anycast and while maintaining user experience without updating data centers with additional capacity.

FIG. 1 is a diagram illustrating a network 100 in which techniques for dynamic data center load balancing using BGP may be implemented, according to an example embodiment. In some embodiments, network 100 may include multiple data centers in different geographic locations, including at least a first data center 110 and a second data center 120. In this embodiment, first data center 110 and second data center 120 may communicate with each other, as well as with one or more users and/or user devices, over a communication network 102, for example, the Internet or other communication network. In other embodiments, it should be understood that network 100 may include additional data centers and the principles of the example embodiments described herein apply to network configurations with two or more data centers.

In an example embodiment, first data center 110 and second data center 120 are associated with a same IP address that is shared in common between the data centers. For example, as described above, first data center 110 and second data center 120 may use Anycast so that the same IP address may be associated with both first data center 110 and second data center 120.

Each data center includes a plurality of servers configured to provide services to one or more users and/or user devices. For example, first data center 110 includes a first plurality of servers 112 and second data center 120 includes a second plurality of servers 122. First plurality of servers 112 and second plurality of servers 122 also are reached by a same IP address that is shared between them (e.g., using an Anycast IP address). Additionally, each data center includes an edge router and a DNS resolver. As shown in FIG. 1, first data center 110 includes a first edge router 114 and a first DNS resolver 116. Similarly, second data center 120 includes a second edge router 124 and a second DNS resolver 126.

In this embodiment, a first user device 130 requests a connection to the IP address shared by first data center 110 and second data center 120 via a translation request 140. Translation request 140 is received by first DNS resolver 116, which forwards translation request 140 to the IP address shared by first data center 110 and second data center 120. In one case, a DNS server at first data center 110 receives translation request 140 and responds with a unicast IP address for a server of first plurality of servers 112 at first data center 110 (i.e., the data center that is topologically the closest to first user device 130) and a direct connection 142 between the server of first plurality of servers 112 and first user device 130 is established. In this case, the DNS server at first data center 110 provides the unicast IP address for the server of first plurality of servers 112 based on advertised BGP routes to first plurality of servers 112 received from first edge router 114.

Similarly, a second user device 132 requests a connection to the IP address shared by first data center 110 and second data center 120 via a translation request 144. Translation request 144 is received by second DNS resolver 126, which forwards translation request 144 to the IP address shared by first data center 110 and second data center 120. In one case, a DNS server at second data center 120 receives translation request 144 and responds with a unicast IP address for a server of second plurality of servers 122 at second data center 120 (i.e., the data center that is topologically the closest to second user device 132) and a direct connection 146 between the server of second plurality of servers 122 and second user device 132 is established. In this case, the DNS server at second data center 120 provides the unicast IP address for the server of second plurality of servers 122 based on advertised BGP routes to second plurality of servers 122 received from second edge router 124.

Figure 2:
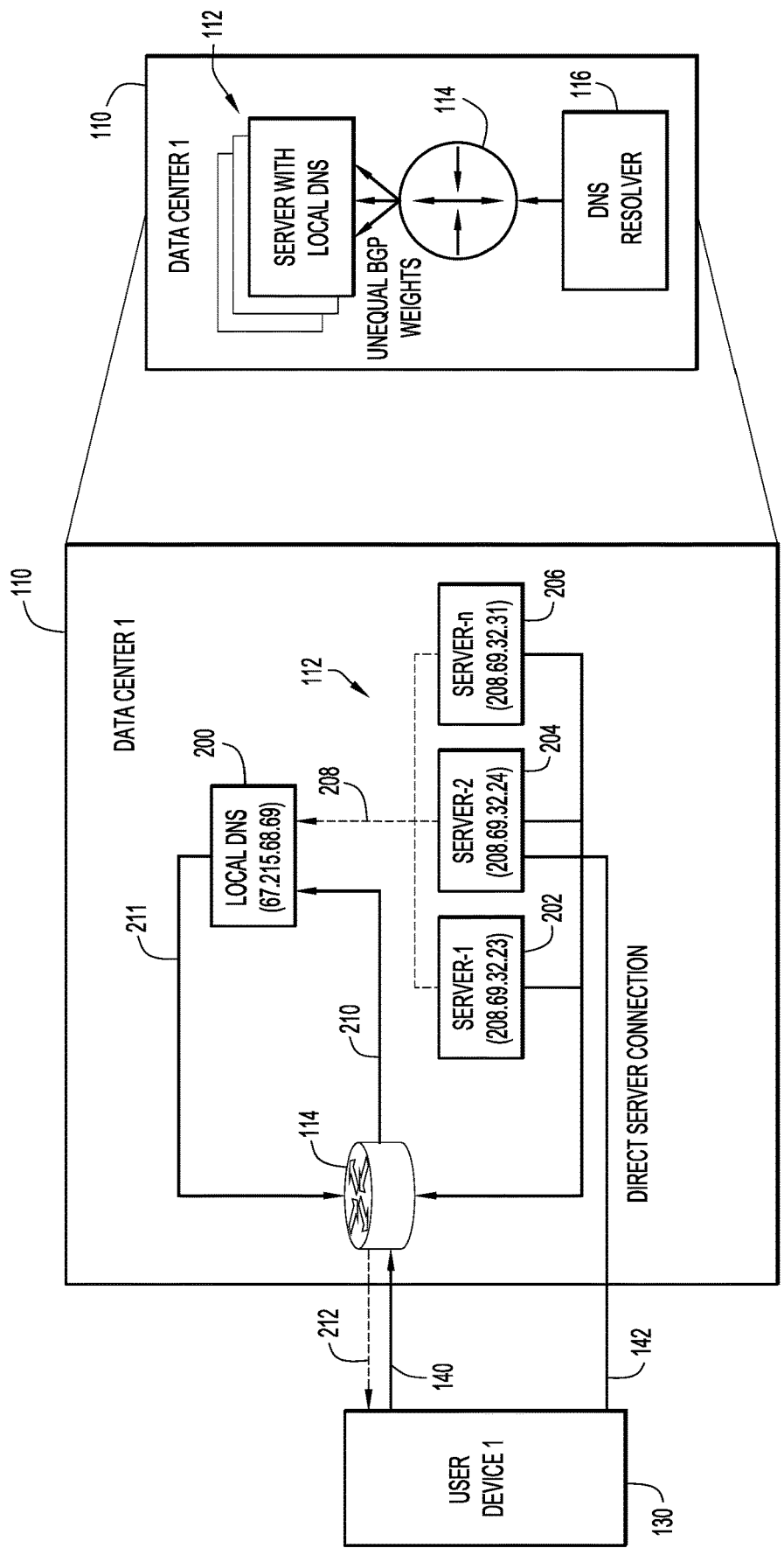
FIG. 2 is a diagram illustrating a representative data center in which techniques for dynamic data center load balancing using BGP may be implemented, according to an example embodiment.

Referring now to FIG. 2, a diagram illustrating a representative data center in which techniques for dynamic data center load balancing using BGP may be implemented, according to an example embodiment. In this embodiment, first data center 110 is the representative data center for the two or more data centers within network 100 that share a same IP address (e.g., via Anycast). In an example embodiment, first data center 110 includes a DNS server 200. DNS server 200 may be in communication with first plurality of servers 112 at first data center 110, including at least a first server 202, a second server 204, and a third server 206.

In some embodiments, DNS server 200 may be configured to monitor multivariate metrics associated with first plurality of servers 112. For example, as shown in FIG. 2, DNS server 200 may receive load information 208 from first server 202, second server 204, and third server 206. Load information 208 may include multiple metrics indicating a particular server's load, for example, one or more of number of connected or connecting users/clients, latency in processing connections, number of busy threads from allocated threads, or other metrics associated with server utilization resources. Based on load information 208 received from first plurality of servers 112, DNS server 200 can determine resource utilization by the servers at the data center and make load balancing decisions according to the techniques described herein.

In this embodiment, first plurality of servers 112, including first server 202, second server 204, and third server 206 are each operating with a load that is under or within a threshold for server load. For example, the server load threshold may be established or determined by DNS server 200 and may be further based on the particular server configuration of each server at first data center 110. That is, the load handling capacity (i.e., server load threshold) differs across heterogeneous server configurations (e.g., a server with 8, 16, 24, or 32 cores may have, respectively, 8, 32, 48, or 64 threads available for processing connections). In the example embodiments, DNS server 200 receives load information 208 from first plurality of servers 112 and uses load information 208 to monitor each server (e.g., first server 202, second server 204, and third server 206) against corresponding load thresholds for that server.

In the scenario depicted in FIG. 2, first plurality of servers 112 are all within their corresponding load thresholds. Accordingly, DNS server 200 provides BGP routes to first server 202, second server 204, and third server 206 to first edge router 114. As described above, when first user device 130 requests a connection to the IP address shared by first data center 110 and second data center 120 via translation request 140, first edge router 114 sends a DNS request 210 to DNS server 200. DNS server 200 selects a server from first plurality of servers 112 (i.e., one of first server 202, second server 204, or third server 206) to fulfill the request and provides a unicast IP address 211 for the selected server to first edge router 114. In some embodiments, DNS server 200 may select a particular server from first plurality of servers 112 based on load balancing criteria, or based on equal or unequal BGP weights between first server 202, second server 204, and third server 206. With this arrangement, servers having greater capacity may receive more traffic and/or connection requests from first edge router 114. In other embodiments, such as where servers of first plurality of servers 112 have substantially similar capacities, traffic and/or connection requests from first edge router 114 may be provided in round-robin fashion to the servers.

Once unicast IP address 211 for the selected server is received at first edge router 114, first edge router 114 transmits a reply 212 to first user device 130 including the unicast IP address for the selected server of first plurality of servers 112 at first data center 110 and direct connection 142 between the selected server and first user device 130 is established.

In this embodiment, first plurality of servers 112 includes three servers (e.g., first server 202, second server 204, and third server 206). In other embodiments, first plurality of servers 112 may include additional servers. In another embodiment, first plurality of servers 112 may include two or more groups of multiple servers. For example, first plurality of servers 112 of first data center 110 may include at least two or more groups of servers associated with different subnets, including a first group of servers associated with a first subnet and a second group of servers associated with a second subnet. DNS server 200 may determine and provide BGP routes associated with servers at first data center 110 to first edge router 114 on a subnet by subnet basis.

Figure 3:
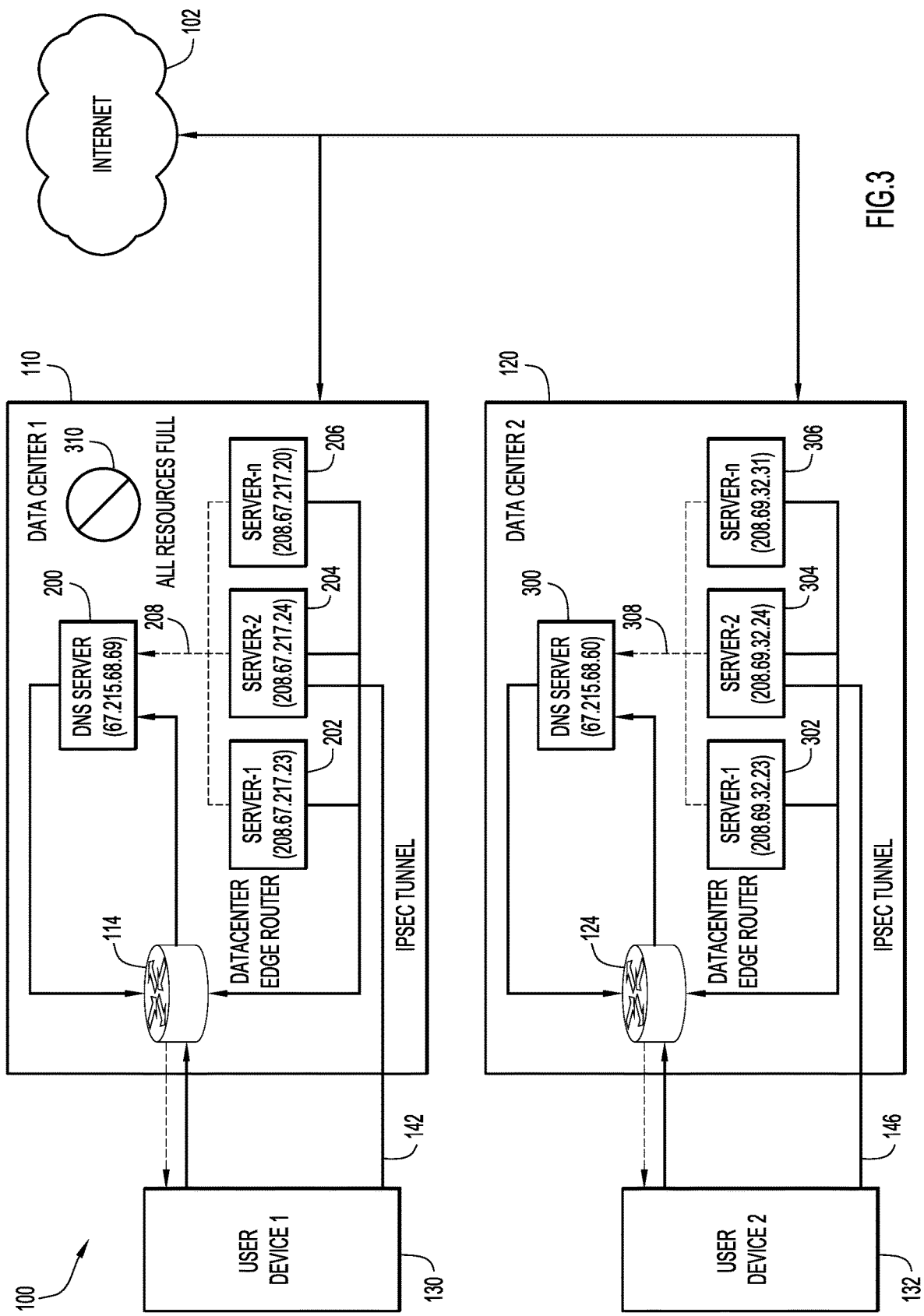
FIG. 3 is a diagram illustrating a procedure for dynamic data center load balancing using BGP, according to an example embodiment.

Referring now to FIG. 3, a diagram illustrating a procedure for dynamic data center load balancing using BGP is shown according to an example embodiment. In this embodiment, network 100 includes first data center 110 and second data center 120 sharing the same IP address (e.g., via Anycast). In this embodiment, second data center 120 has a similar configuration as first data center 110 described in detail above with reference to FIG. 2. For example, second data center 120 includes a DNS server 300 that monitors the second plurality of servers 122, including at least a first server 302, a second server 304, and a third server 306. Additionally, as described above with reference to DNS server 200, DNS server 300 of second data center 120 is also configured to monitor load information 308 that includes multivariate metrics associated with second plurality of servers 122. For example, as shown in FIG. 3, DNS server 300 may receive load information 308 from first server 302, second server 304, and third server 306. Based on load information 308 received from second plurality of servers 122, DNS server 300 can determine resource utilization by the servers at the data center and make load balancing decisions according to the techniques described herein.

In this embodiment, first user device 130 is connected with first data center 110 via direct connection 142 and second user device 132 is connected with second data center 120 via direct connection 146, as described above in reference to FIG. 1. In this embodiment, however, DNS server 200 at first data center 110 determines that first plurality of servers 112 (e.g., first server 202, second server 204, and third server 206) are experiencing a load that exceeds a threshold. For example, based on load information 208, DNS server 200 may determine that the load on first plurality of servers 112 of first data center 110 exceeds a threshold and all available resources are full. As a result, DNS server 200 may determine that first data center 110 should not receive any new connection requests from new users and/or user devices (i.e., resources full 310).

For example, DNS server 200 monitors the statistics associated with first plurality of servers 112 at first data center 110 (e.g., based on load information 208) and determines how many connections are being served, how many connections are attempting to connect, and the percentage of allocated processing threads remain free and/or available. When all of the servers of first plurality of servers 112 are serving connections below available capacity, then each of first server 202, second server 204, and third server 206 remain online and DNS server 200 provides BGP routes to servers of first plurality of servers 112 to first edge router 114.

Once the allocated resources of first plurality of servers 112 at first data center 110 exceed the load threshold, and remain using this high consumption of resources for a predetermined period of time, then DNS server 200 may dynamically change the weights of the BGP routes to servers of first plurality of servers 112. In one embodiment, DNS server 200 may change the weights of one or more servers that exceed the load threshold by assigning a weight of zero "0" to servers that no longer have resources available. These servers will continue to serve existing connections until their completion, for example, serving existing direct connection 142 with first user device 130, but will no longer accept new connection requests.

In this embodiment, DNS server 200 dynamically changes the weights of BGP routes associated with the servers that exceed their corresponding load threshold by lowering the weight of those routes (e.g., changing the weight to zero "0"). In other embodiments, DNS server 200 may instead increase the weight assigned to servers with remaining capacity so that their BGP route weights are greater than the BGP route weights of the servers without capacity. For example, weights associated with the BGP routes may have a value from 0 up to 65535.

At this point, if any remaining servers of first plurality of servers 112 still have available capacity (i.e., are not exceeding their corresponding load threshold), then first edge router 114 may advertise BGP routes for the servers with capacity and assign new connection requests from new users and/or user devices to the remaining servers with capacity at first data center 110. However, when all of first plurality of servers 112 exceed load thresholds (i.e., resources full 310) at first data center 110, then DNS server 200 dynamically changes the weights of BGP routes associated with all servers of first plurality of servers 112 at first data center 110 such that the weights are smaller than weights associated with BGP routes to servers of second plurality of servers 122 of second data center 120. As a result, first data center 110 no longer remains visible to users and/or user devices making new connection requests. That is, first edge router 114 will not serve a unicast IP address for a server from first data center 110 in response to a new connection request because the weights of the BGP routes to those servers have been changed. Instead, new incoming connection requests will be served from servers of the next nearest (i.e., topologically closest) data center, for example, second data center 120.

This arrangement may continue as long as the servers of first plurality of servers 112 at first data center 110 remain over their load thresholds, for example, based on periodic comparison of multivariate metrics of the servers received by DNS server 200 determined using load information 208. Once the loads on the servers of first plurality of servers 112 at first data center 110 fall below the load threshold, which may also include a confidence interval or other measure to ensure against transitory fluctuations, DNS server 200 may again change and provide the weights associated with BGP routes to the servers of first plurality of servers 112 at first data center 110 to first edge router 114 so that first edge router 114 begins serving unicast IP addresses for servers from first data center 110 in response to new connection requests.

Figure 4:
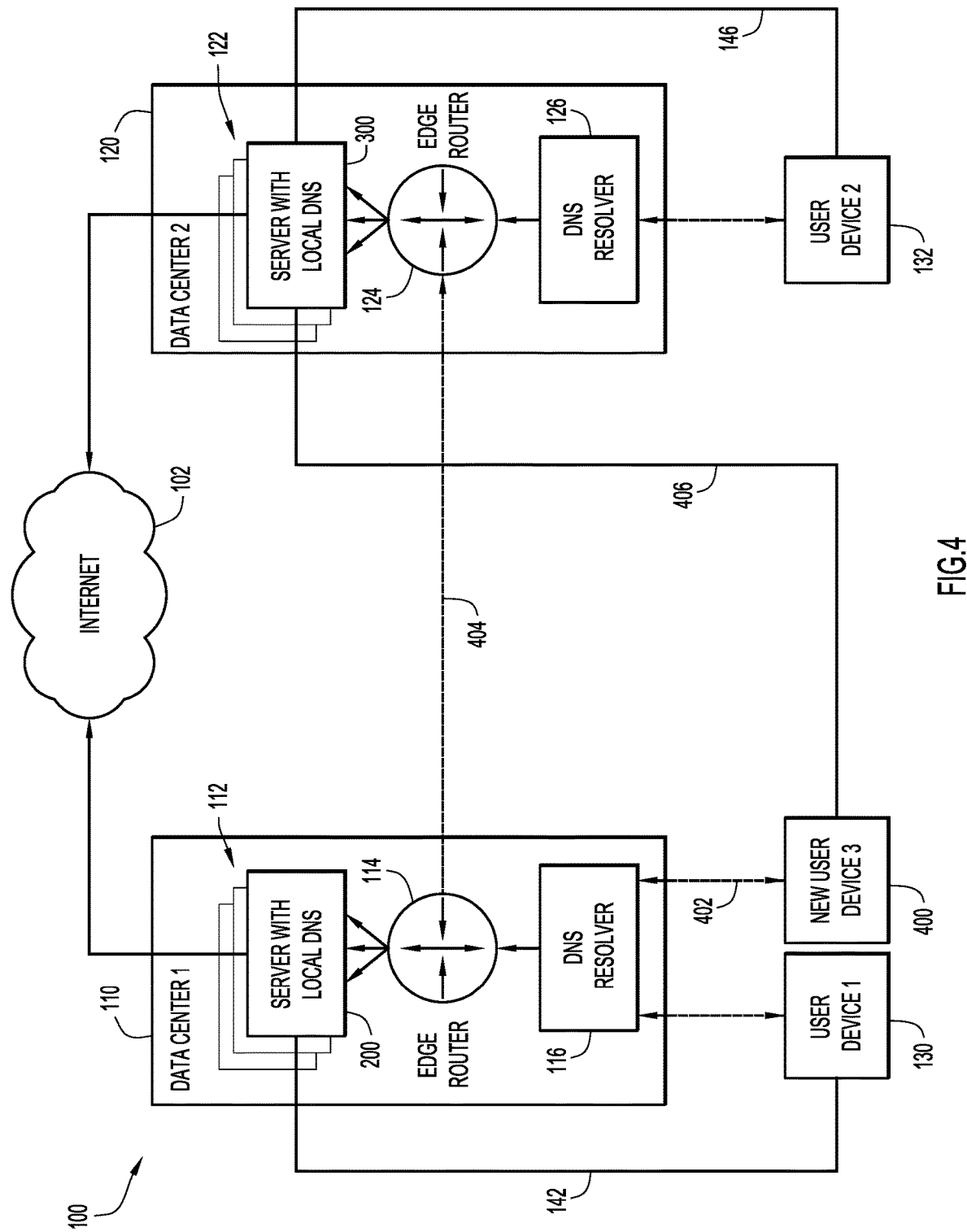
FIG. 4 is a diagram illustrating a new connection request in a network in which techniques for dynamic data center load balancing using BGP are implemented, according to an example embodiment.

FIG. 4 illustrates a new connection request in network 100 according to the techniques for dynamic data center load balancing using BGP described herein. In this embodiment, first data center 110 and second data center 120 are in different geographical locations and share the same IP address (e.g., via Anycast) as described above in reference to FIG. 1. Also as described above, each data center already has existing connections with one or more users and/or user devices. For example, a server of first plurality of servers 112 at first data center 110 is serving first user device 130 via direct connection 142 and a server of second plurality of servers 122 at second data center 120 is serving second user device 132 via direct connection 146.

In this embodiment, DNS server 200 has determined that first plurality of servers 112 at first data center 110 exceed a load threshold, for example, based on load information 208, as described above. As a result, DNS server 200 dynamically changes the weights of the BGP routes to the servers of first plurality of servers 112 at first data center 110 to have a lower weight (i.e., such that the BGP route weights for the servers of first plurality of servers 112 are smaller than the weights of the BGP routes to servers of second plurality of servers 122 of second data center 120). As described above, in one embodiment, the DNS server 200 may change the weights of the BGP routes to the servers of first plurality of servers 112 to be zero "0". DNS server 200 provides the updated BGP routes to first edge router 114. First edge router 114 advertises the updated BGP routes such that the BGP routes to servers of second plurality of servers 122 of second data center 120 now have a greater weight than the BGP routes to servers of first plurality of servers 112 of first data center 110.

As a result, upon receiving a new connection request from a new user device 400 for a connection to the same IP address for first data center 110 and second data center 120, new user device 400 is connected to a server of second plurality of servers 122 of second data center 120 based on an advertised BGP route from first edge router 114. For example, as shown in FIG. 4, new user device 400 is geographically and topologically closest to first data center 110. When new user device 400 sends new connection request 402 to the same IP address for first data center 110 and second data center 120, first DNS resolver 116 at first data center 110 receives the connection request and forwards the request to the same IP address shared by the DNS servers for first data center 110 and second data center 120 (i.e., DNS server 200 and DNS server 300). First edge router 114 receives the request and checks the advertised BGP routes to servers that are available to fulfill the request.

In this embodiment, because DNS server 200 has dynamically changed the weights of the BGP routes to the servers of first plurality of servers 112 at first data center 110 (e.g., first server 202, second server 204, and third server 206) to be smaller than the weights of the BGP routes to the servers of second plurality of servers 122 at second data center 120 (e.g., first server 302, second server 304, and third server 306), first edge router 114 routes new connection request to DNS server 300 at second data center 120 through second edge router 124 via request 404. DNS server 300 selects a server of the second plurality of servers 122 to fulfill the request and provides a unicast IP address to new user device 400 of the server selected from servers of second plurality of servers 122 at second data center 120. That is, because the weighting of the BGP routes to servers of second plurality of servers 122 at second data center 120 have a greater weight, first edge router 114 determines that second plurality of servers 122 represent the best route to a server to fulfil new connection request 402 from new user device 400. As a result, new user device 400 is connected to a server selected from servers of second plurality of servers 122 at second data center 120 via a connection 406.

With this arrangement, by dynamically changing the weights of BGP routes to servers of a data center when that data center is experiencing heavy loads, the data center is able to effectively withdraw itself from new connection requests to a common IP address (e.g., via Anycast) shared between multiple data centers in different geographic locations without disrupting the existing BGP session. Because the BGP session remains active, the data center is able to dynamically re-insert BGP routes to its servers once the load subsides, by changing back the weights of the BGP routes, so that new connection requests to the common IP address may once again be served by the data center.

Figure 5:
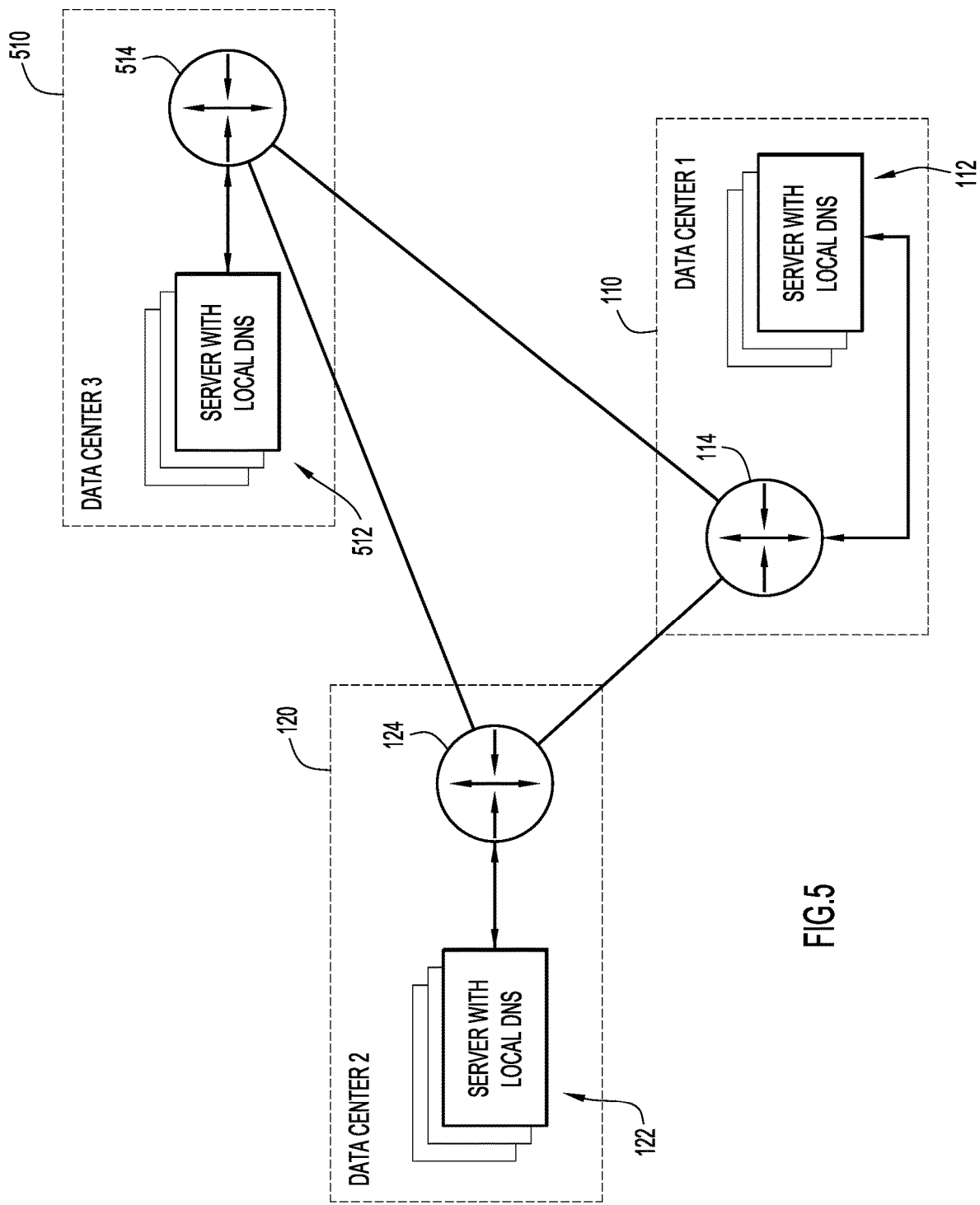
FIG. 5 is a diagram illustrating multiple data centers implementing techniques for dynamic data center load balancing using BGP in a network, according to an example embodiment.

FIG. 5 is a diagram illustrating multiple data centers implementing techniques for dynamic data center load balancing using BGP in a network, according to an example embodiment. In this embodiment, a network includes first data center 110, second data center 120, and a third data center 510. Third data center 510 is configured substantially similar to first data center 110 and/or second data center 120, as described above, and includes at least a third plurality of servers 512 and a third edge router 514.

In one embodiment, first plurality of servers 112 at first data center 110 may be fully loaded (i.e., all resources full 310, as shown in FIG. 3). In this embodiment, the BGP peer session for first data center 110 continues, but DNS server 200 at first data center 110 stops publishing the IP addresses for the servers of the first plurality of servers 112 (or, in some embodiments, subnets associated with various groups of servers) to first edge router 114 at first data center 110. As a result, new connection requests will be routed to servers of second plurality of servers 122 at second data center 120 and/or servers of third plurality of servers 512 at third data center 510 based on the BGP routes advertised by first edge router 114.

With this arrangement, first data center 110 is not taken down and is still available to handle existing connections. Only new connection requests are redirected to other nearby data centers (e.g., second data center 120 and/or third data center 510). Additionally, because the BGP peer session has been maintained, once the load on first plurality of servers 112 at first data center 110 subsides such that the servers are capable of handling new connections, DNS server 200 at first data center 110 may add the IP addresses for the servers of the first plurality of servers 112 (or, in some embodiments, subnets associated with various groups of servers) to first edge router 114 at first data center 110. Once first edge router 114 begins advertising the updated BGP routes for the first plurality of servers 112, new connections may once again be served by servers from first data center 110.

These techniques described herein provide high service quality to customers even when the nearest data center is fully loaded and in a seamless manner. Additionally, the techniques of the example embodiments provide a reduction in connection retrial and connection latency.

Figure 6:
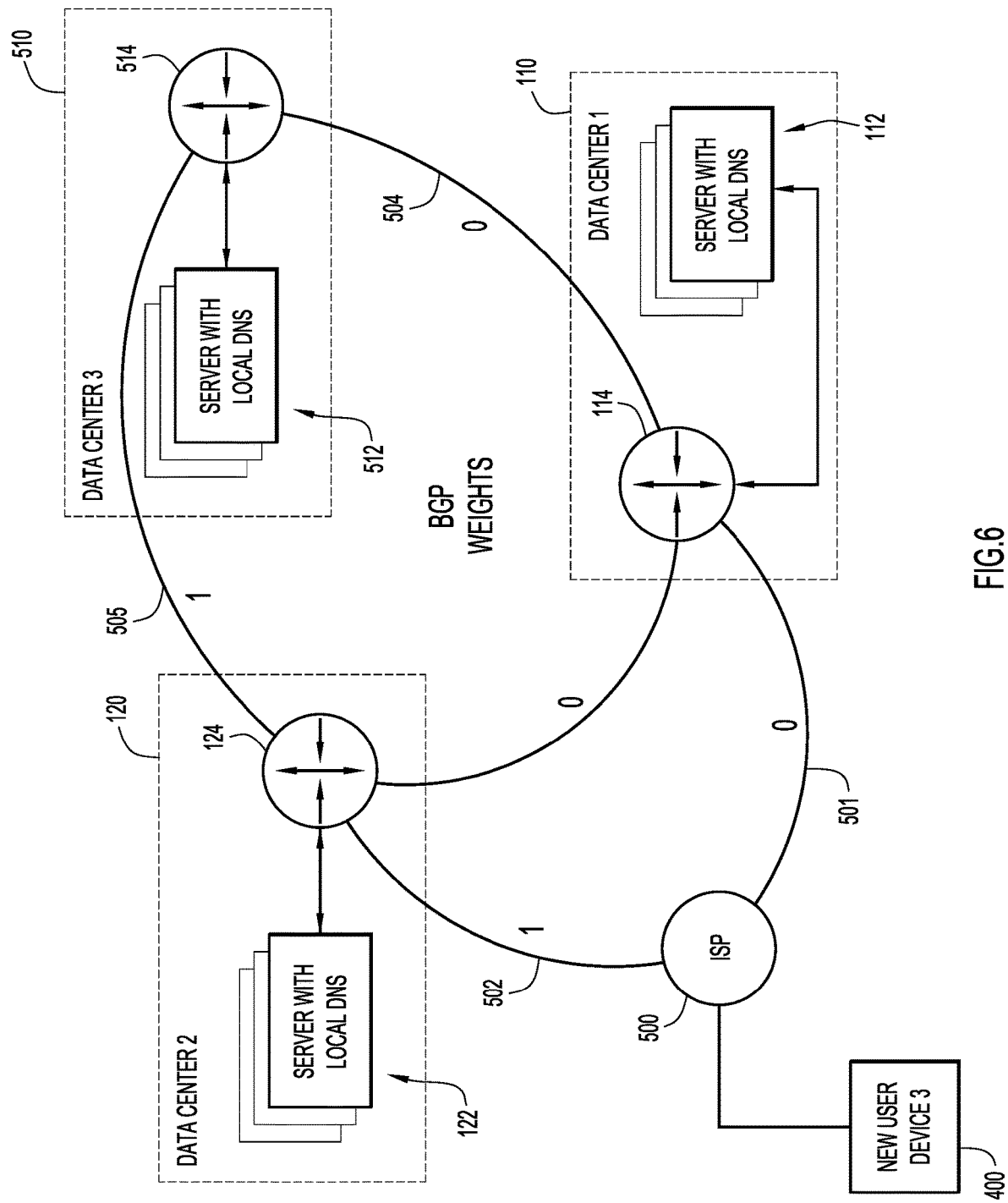
FIG. 6 is a diagram illustrating BGP weighting for dynamic data center load balancing, according to an example embodiment.

FIG. 6 is a diagram illustrating BGP weighting for dynamic data center load balancing, according to an example embodiment. For example, FIG. 6 illustrates an example of a change made to a weight of BGP routes 501, 503, 504 to the servers of first plurality of servers 112 of first data center 110 by DNS server 200 so that new connection request 402 from new user device 400 is routed to a server from second plurality of servers 122 of second data center 120 instead of first data center 110, which is geographically and/or topologically closest to new user device 400.

In this embodiment, DNS server 200 has dynamically changed the weight (e.g., zero "0") of the BGP routes 501, 503, 504 to the servers of first plurality of servers 112 at first data center 110 such that first edge router 114 does not advertise BGP routes to the servers of first plurality of servers 112 at first data center 110. That is, by changing the weight of the servers of first plurality of servers 112 at first data center 110 to be smaller than a weight of the BGP routes 502 (e.g., one "1") to the servers of second plurality of servers 122 at second data center 120 and/or the BGP routes 505 (e.g., one "1") to the servers of third plurality of servers 512 at third data center 510, new connection requests will be connected only to servers at second data center 120 and/or third data center 510. As an example, in this embodiment, the weight for the BGP routes 501, 503, 504 to servers of first plurality of servers 112 at first data center 110 has been changed to zero "0" from a higher value. In comparison, the weight for the BGP routes 502 to servers of second plurality of servers 122 at second data center 120 and the weight for the BGP routes 505 to servers of third plurality of servers 512 at third data center 510 is one "1"

In this scenario, when new user device 400 requests a new connection to the same IP address shared by first data center 110, second data center 120, and third data center 510, a customer edge router 500 (which may receive BGP routing information from first edge router 114, second edge router 124, and/or third edge router 514) determines that the best route, based on advertised BGP routes to the IP address for the data center, is associated with the BGP routes to servers of second plurality of servers 122 at second data center 120 because those servers have a greater weight (i.e., one "1" is greater than zero "0"). As a result, the connection request from new user device 400 is fulfilled by a server of second plurality of servers 122 at second data center 120.

In this example, the weights are zero "0" and "1". However, in other embodiments, weights associated with the BGP routes may have a value from 0 up to 65535. Additionally, as described above, in other embodiments, DNS server 200 may instead increase the weight assigned to servers with remaining capacity so that their BGP route weights are greater than the BGP route weights of the servers without capacity.

In another embodiment, servers may be arranged into two or more groups of servers associated with different subnets. For example, first plurality of servers 112 of first data center 110 and/or second plurality of servers 122 of second data center 120 may each include at least two or more groups of servers associated with different subnets, including a first group of servers associated with a first subnet and a second group of servers associated with a second subnet. In these embodiments, a DNS server (e.g., DNS server 200) may advertise or announce BGP routes associated with servers on a subnet by subnet basis and may dynamically change weights of the BGP routes for each subnet based on load balancing considerations (e.g., based on load information indicating that a server load on a subnet exceeds a threshold).

Figure 7:
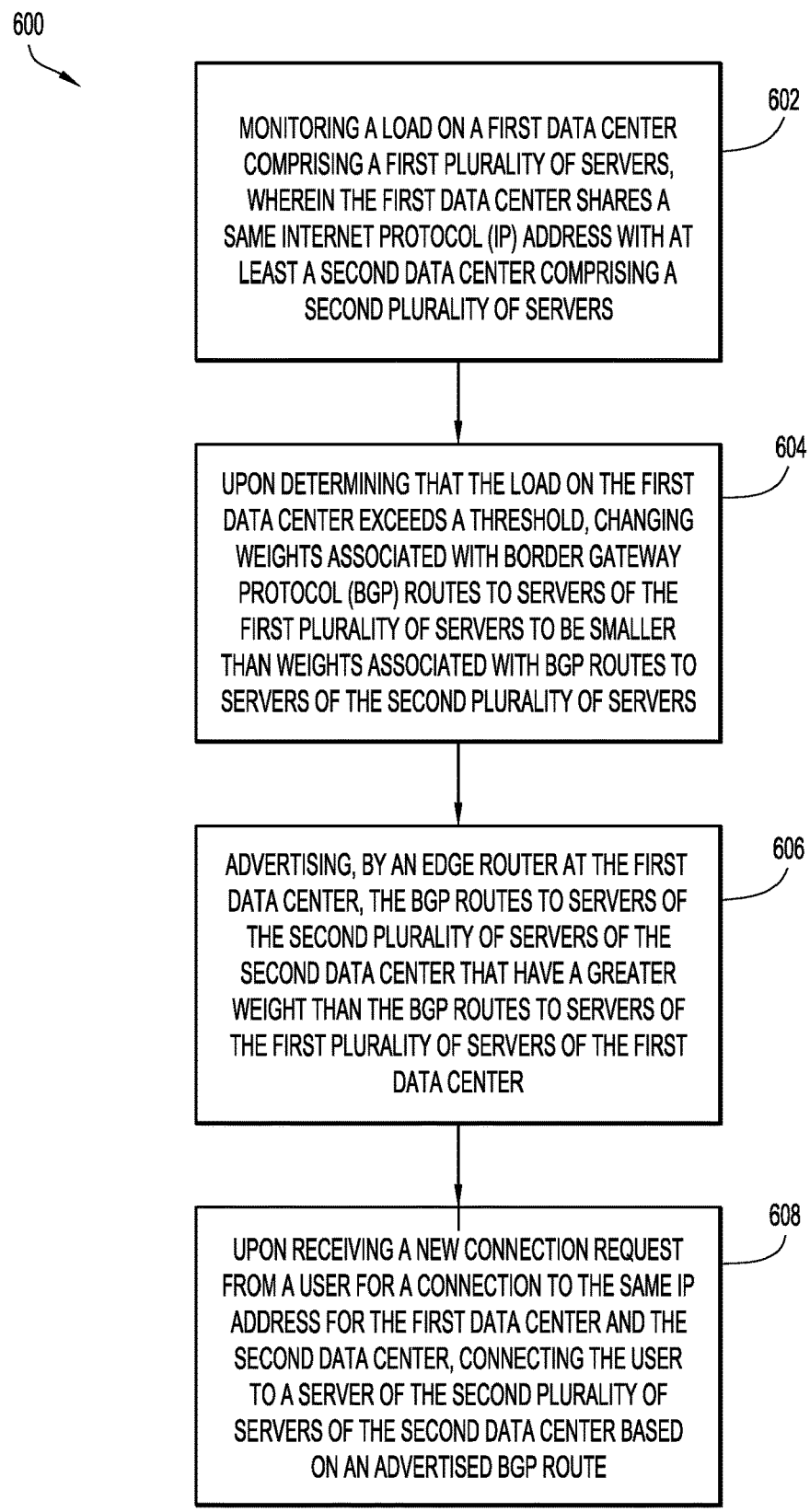
FIG. 7 is a flowchart illustrating a method of dynamic data center load balancing using BGP, according to an example embodiment.

FIG. 7 is a flowchart illustrating a method 600 of dynamic data center load balancing using BGP, according to an example embodiment. In some embodiments, method 600 may be implemented by a DNS server (e.g., DNS server 200) at a data center (e.g., first data center 110). In an example embodiment, method 600 may begin at an operation 602 where a load on a first data center comprising a first plurality of servers is monitored. The first data center shares a same IP address with at least a second data center comprising a second plurality of servers. For example, DNS server 200 may monitor a load on first plurality of servers 112 at first data center 110 that shares the same IP address with second data center 120.

Next, at an operation 604, upon determining that the load on the first data center exceeds a threshold, method 600 includes changing weights associated with BGP routes to the servers of the first plurality of servers to be smaller than weights associated with BGP routes to the servers of the second plurality of servers at the second data center. For example, as described above in reference to FIGS. 1-6.

Method 600 may then proceed to an operation 606, where the BGP routes to servers of the second plurality of severs of the second data center that have a greater weight than the BGP routes to servers of the first plurality of servers of the first data center are advertised or announced by an edge router. That is, at operation 606, the updated BGP routes to the servers of each data center are advertised or announced by an edge router so that BGP routing information with the new weights can be updated through the network. For example, DNS server 200, after dynamically changing the BGP weights based on the load of first data center 110 exceeding the threshold, may then provide the updated BGP routes to first edge router 114 to announce or advertise the updated weights of the BGP routes to second edge router 124, as well as other network devices or elements in network 100 that maintain or use BGP routing information.

At an operation 608, upon receiving a new connection request from a user and/or user device for a connection to the same IP address for the first data center and the second data center, the user and/or user device is connected to a server of the second plurality of servers of the second data center based on an advertised BGP route. For example, the updated BGP routes may be advertised or announced at operation 606. With this arrangement, method 600 provides techniques for dynamic data center load balancing using BGP in a network.

Figure 8:
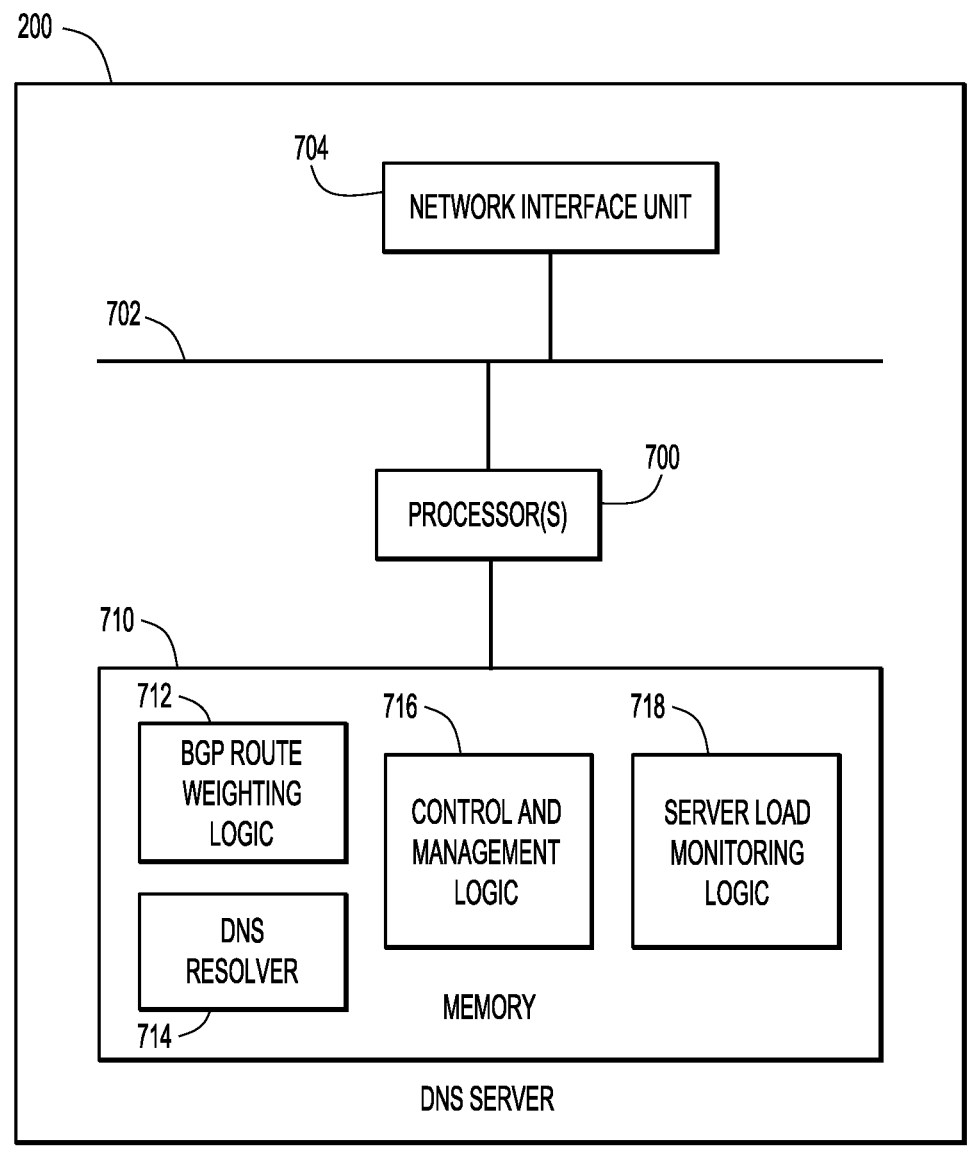
FIG. 8 is a block diagram of a Domain Name System server for implementing techniques for dynamic data center load balancing using BGP in a network, according to an example embodiment.

FIG. 8 is a block diagram of a representative DNS server for implementing techniques for dynamic data center load balancing using BGP in a network, according to an example embodiment. In this embodiment, DNS server 200 may be the representative DNS server configured to perform the operations described above with reference to FIGS. 1-7.

DNS server 200 includes one or more processors 700, memory 710, a bus 702 and a network interface unit 704, such as one or more network interface cards that enable network connectivity. The memory 710 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 710 may comprise one or more tangible (non-transitory) computer readable storage media (e.g., a memory device) encoded with software comprising computer executable instructions and when the software is executed (by the processor 700) it is operable to perform the DNS server operations described herein.

The memory 710 stores instructions for control and management logic 716, that when executed by the processor 700, cause the processor to perform the software defined control and management operations described herein. The memory 710 also stores instructions for operations associated with the techniques for dynamic data center load balancing using BGP in a network described herein. For example, memory 710 may further include a BGP route weighting logic 712, a DNS resolver logic 714, and a server load monitoring logic 718.

In an example embodiment, BGP route weighting logic 712 may cause processor 700 to perform operations associated with changing weights associated with the BGP routes to the servers of the data center, as well as, providing the changed BGP routes to an edge router for advertising or announcing the BGP routes to other devices on the network.

DNS resolver logic 714 may cause processor 700 to perform operations associated with receiving connection requests from users and/or user devices addressed to the same IP address assigned to multiple data centers and providing a server unicast IP address back to the requesting user and/or user device to fulfill the request. For example, DNS resolver logic 714 may cause processor 700 to provide a unicast IP address of a server of first plurality of servers 112 of first data center 110 or a server of second plurality of servers 122 of second data center 120, as described above.

In an example embodiment, server load monitoring logic 718 may cause processor 700 to perform operations associated with monitoring and determining the utilization of resources by servers at a data center. For example, server load monitoring logic 718 may determine whether a load on a data center and/or individual servers at the data center exceed a threshold using load information, as described in reference to the operations described above. Additionally, server load monitoring logic 718 may also continue monitoring resource utilization at the data center to determine when the load has been reduced below the threshold for changing the weights of the BGP routes back to the previous values.

The principles of the example embodiments provide a solution that makes use of multivariate metrics in data centers with heterogeneous configurations to dynamically control the effective insertion and/or withdrawal from Anycast, by keeping the BGP session up but only controlling the announcements on it.

In one example use case scenario, the techniques described herein may be used on an IP blocking system, where enterprise roaming clients (i.e., laptops, mobile devices, etc.) establish Internet Protocol Security (IPSec) VPN connections to the IP blocking service to remain protected at all times. The IP blocking system protects clients from connections destined for malicious IP addresses that would otherwise bypass core DNS-based protections, thereby allowing thorough protection of clients.

The example embodiments described herein provide techniques that dynamically load balance new connection requests between data centers, while allowing connected VPN tunnels (i.e., existing connections) to continue to remain connected unless a client itself decides to disconnect. Additionally, the techniques described herein allow services to existing connections to be unaffected by new server loads.

In addition, the techniques described herein allow a client to cache a resolved IP address and re-establish a connection with the last connected server without having the incoming request rejected by the server. Once the load on the servers is within the permissible load threshold, BGP route announcements to the servers of the data center automatically resume accepting new connection requests.

The principles of the present embodiments provide a number of benefits or improvements over conventional Anycast-based systems. For example, over planning for data center capacity can be avoided and individual servers can be taken out of rotation for planned maintenance without worrying about whether the remaining servers in the data center are sufficient to handle the connections/traffic during peak hours. Connection distribution can be based on heterogeneous server configurations, for example, BGP weights can be manipulated to route connections or traffic to more capable servers, rather than only relying on a round-robin method from an edge router.

The example embodiments also provide a graceful data center to data center failover solution without any impact to the client/customer experience. In addition, custom metrics may be used to load balance servers within and across data centers. The principles of the example embodiments described herein also eliminate the need for a single data center to keep spare capacity to take over loads from a nearby data center in the case of scheduled downtime or accidental shutdown.

In summary, a method is provided comprising: monitoring, by a Domain Name System (DNS) server at a first data center comprising a first plurality of servers, a load on the first data center, wherein the first data center shares a same Internet Protocol (IP) address with at least a second data center comprising a second plurality of servers, the first data center and the second data center being located in different geographic locations; upon determining that the load on the first data center exceeds a threshold, changing weights associated with Border Gateway Protocol (BGP) routes to servers of the first plurality of servers to be smaller than weights associated with BGP routes to servers of the second plurality of servers; advertising, by an edge router at the first data center, the BGP routes to servers of the second plurality of servers of the second data center that have a greater weight than the BGP routes to servers of the first plurality of servers of the first data center; and upon receiving a new connection request from a user for a connection to the same IP address for the first data center and the second data center, connecting the user to a server of the second plurality of servers of the second data center based on an advertised BGP route from the edge router.

In another form, a non-transitory computer readable storage media encoded with instructions that, when executed by a processor of a Domain Name System (DNS) server at a first data center comprising a first plurality of servers, cause the processor to: monitor a load on the first data center, wherein the first data center shares a same Internet Protocol (IP) address with at least a second data center comprising a second plurality of servers, the first data center and the second data center being located in different geographic locations; upon determining that the load on the first data center exceeds a threshold, change weights associated with Border Gateway Protocol (BGP) routes to servers of the first plurality of servers to be smaller than weights associated with BGP routes to servers of the second plurality of servers; provide the changed weights associated with the BGP routes to servers of the first plurality of servers to an edge router at the first data center, wherein the edge router is configured to advertise the BGP routes to servers of the second plurality of servers of the second data center that have a greater weight than the BGP routes to servers of the first plurality of servers of the first data center; and wherein upon receiving a new connection request from a user for a connection to the same IP address for the first data center and the second data center, the edge router is configured to connect the user to a server of the second plurality of servers of the second data center based on an advertised BGP route from the edge router.

Furthermore, an apparatus is provided comprising: a plurality of network ports configured to receive inbound packets and to send outbound packets; a memory; a processor coupled to the memory and to the plurality of network ports, wherein the processor is configured to: monitor a load on a first data center comprising a first plurality of servers, wherein the first data center shares a same Internet Protocol (IP) address with at least a second data center comprising a second plurality of servers, the first data center and the second data center being located in different geographic locations; upon determining that the load on the first data center exceeds a threshold, change weights associated with Border Gateway Protocol (BGP) routes to servers of the first plurality of servers to be smaller than weights associated with BGP routes to servers of the second plurality of servers; provide the changed weights associated with the BGP routes to servers of the first plurality of servers to an edge router at the first data center, wherein the edge router is configured to advertise the BGP routes to servers of the second plurality of servers of the second data center that have a greater weight than the BGP routes to servers of the first plurality of servers of the first data center; and wherein upon receiving a new connection request from a user for a connection to the same IP address for the first data center and the second data center, the edge router is configured to connect the user to a server of the second plurality of servers of the second data center based on an advertised BGP route from the edge router.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   monitoring, by a Domain Name System (DNS) server at a first data center comprising a first plurality of servers, a load on the first data center, wherein the first data center shares an anycast Internet Protocol (IP) address with at least a second data center comprising a second plurality of servers, the first data center and the second data center being located in different geographic locations;
   upon determining that the load on the first data center exceeds a threshold, changing weights associated with Border Gateway Protocol (BGP) routes to servers of the first plurality of servers to be smaller than weights associated with BGP routes to servers of the second plurality of servers;
   advertising, by an edge router in the first data center, the BGP routes to servers of the second plurality of servers of the second data center that have a greater weight than the BGP routes to servers of the first plurality of servers of the first data center; and
   upon receiving a new connection request at the edge router in the first data center from a user for a connection to the anycast IP address, connecting the user to a server of the second plurality of servers of the second data center based on an advertised BGP route from the edge router,
   wherein one or more existing connections to the servers of the first plurality of servers of the first data center remain connected after changing the weights associated with the BGP routes to the servers of the first plurality of servers to be smaller than the weights associated with the BGP routes to the servers of the second plurality of servers.

2. The method of claim 1, further comprising:
   upon determining that the load on the first data center falls below the threshold, changing the weights associated with the BGP routes to the servers of the first plurality of servers to be larger than the weights associated with BGP routes to the servers of the second plurality of servers; and
   advertising updated BGP routes to the servers of the first plurality of servers of the first data center that have a greater weight than the BGP routes to the servers of the second plurality of servers of the second data center.

3. The method of claim 2, further comprising:
   upon receiving a second new connection request from a second user for a connection to the anycast IP address, connecting the second user to a server of the first plurality of servers of the first data center based on an advertised updated BGP route from the edge router.

4. The method of claim 1, wherein the weights associated with the BGP routes have a value from 0 up to 65535.

5. The method of claim 1, wherein the first plurality of servers of the first data center includes at least two or more groups of servers associated with different subnets.

6. The method of claim 5, further comprising:
   upon determining that a load on a first group of servers associated with a first subnet from the first plurality of servers exceeds a threshold, changing weights associated with BGP routes to servers of the first group of servers associated with the first subnet to be smaller than weights associated with BGP routes to servers of a second group of servers associated with a second subnet from the first plurality of servers.

7. One or more non-transitory computer readable storage media encoded with instructions that, when executed by a processor of a Domain Name System (DNS) server at a first data center comprising a first plurality of servers, cause the processor to:
   monitor a load on the first data center, wherein the first data center shares an anycast Internet Protocol (IP) address with at least a second data center comprising a second plurality of servers, the first data center and the second data center being located in different geographic locations;
   upon determining that the load on the first data center exceeds a threshold, change weights associated with Border Gateway Protocol (BGP) routes to servers of the first plurality of servers to be smaller than weights associated with BGP routes to servers of the second plurality of servers;
   provide the changed weights associated with the BGP routes to servers of the first plurality of servers to an edge router in the first data center, wherein the edge router is configured to advertise the BGP routes to servers of the second plurality of servers of the second data center that have a greater weight than the BGP routes to servers of the first plurality of servers of the first data center; and wherein upon receiving a new connection request at the edge router in the first data center from a user for a connection to the anycast IP address, the edge router is configured to connect the user to a server of the second plurality of servers of the second data center based on an advertised BGP route from the edge router, and wherein one or more existing connections to the servers of the first plurality of servers of the first data center remain connected after changing the weights associated with the BGP routes to the servers of the first plurality of servers to be smaller than the weights associated with the BGP routes to the servers of the second plurality of servers.

8. The one or more non-transitory computer readable storage media of claim 7, wherein the instructions further cause the processor to:

upon determining that the load on the first data center falls below the threshold, change the weights associated with the BGP routes to the servers of the first plurality of servers to be larger than the weights associated with BGP routes to the servers of the second plurality of servers; and provide the changed weights associated with the BGP routes to the servers of the first plurality of servers to the edge router, wherein the edge router is configured to advertise updated BGP routes to the servers of the first plurality of servers of the first data center that have a greater weight than the BGP routes to the servers of the second plurality of servers of the second data center.

9. The one or more non-transitory computer readable storage media of claim 8, wherein:

upon receiving a second new connection request from a second user for a connection to the anycast IP address, the edge router is configured to connect the second user to a server of the first plurality of servers of the first data center based on an advertised updated BGP route from the edge router.

10. The one or more non-transitory computer readable storage media of claim 7, wherein the weights associated with the BGP routes have a value from 0 up to 65535.

11. The one or more non-transitory computer readable storage media of claim 7, wherein the first plurality of servers of the first data center includes at least two or more groups of servers associated with different subnets.

12. The one or more non-transitory computer readable storage media of claim 11, wherein the instructions further cause the processor to:

upon determining that a load on a first group of servers associated with a first subnet from the first plurality of servers exceeds a threshold, change weights associated with BGP routes to servers of the first group of servers associated with the first subnet to be smaller than weights associated with BGP routes to servers of a second group of servers associated with a second subnet from the first plurality of servers.

13. An apparatus comprising:

a plurality of network ports configured to receive inbound packets and to send outbound packets;

a memory;

a processor coupled to the memory and to the plurality of network ports, wherein the processor is configured to:

monitor a load on a first data center comprising a first plurality of servers, wherein the first data center shares an anycast Internet Protocol (IP) address with at least a second data center comprising a second plurality of servers, the first data center and the second data center being located in different geographic locations;

upon determining that the load on the first data center exceeds a threshold, change weights associated with Border Gateway Protocol (BGP) routes to servers of the first plurality of servers to be smaller than weights associated with BGP routes to servers of the second plurality of servers;

provide the changed weights associated with the BGP routes to servers of the first plurality of servers to an edge router in the first data center, wherein the edge router is configured to advertise the BGP routes to servers of the second plurality of servers of the second data center that have a greater weight than the BGP routes to servers of the first plurality of servers of the first data center; and wherein upon receiving a new connection request at the edge router in the first data center from a user for a connection to the anycast IP address, the edge router is configured to connect the user to a server of the second plurality of servers of the second data center based on an advertised BGP route from the edge router, and wherein one or more existing connections to the servers of the first plurality of servers of the first data center remain connected after changing the weights associated with the BGP routes to the servers of the first plurality of servers to be smaller than the weights associated with the BGP routes to the servers of the second plurality of servers.

14. The apparatus of claim 13, wherein the processor is further configured to:

upon determining that the load on the first data center falls below the threshold, change the weights associated with the BGP routes to the servers of the first plurality of servers to be larger than the weights associated with BGP routes to the servers of the second plurality of servers; and provide the changed weights associated with the BGP routes to the servers of the first plurality of servers to the edge router, wherein the edge router is configured to advertise updated BGP routes to the servers of the first plurality of servers of the first data center that have a greater weight than the BGP routes to the servers of the second plurality of servers of the second data center.

15. The apparatus of claim 14, wherein upon receiving a second new connection request from a second user for a connection to the anycast IP address, the edge router is configured to connect the second user to a server of the first plurality of servers of the first data center based on an advertised updated BGP route from the apparatus.

16. The apparatus of claim 13, wherein the weights associated with the BGP routes have a value from 0 up to 65535.

17. The apparatus of claim 13, wherein the first plurality of servers of the first data center includes at least two or more groups of servers associated with different subnets, and wherein the processor is further configured to:

upon determining that a load on a first group of servers associated with a first subnet from the first plurality of servers exceeds a threshold, change weights associated with BGP routes to servers of the first group of servers associated with the first subnet to be smaller than weights associated with BGP routes to servers of a second group of servers associated with a second subnet from the first plurality of servers.

18. The method of claim 1, wherein determining that the load on the first data center exceeds the threshold comprises comparing a server load for each particular server in the first plurality of servers to a server load threshold corresponding to the particular server based on a configuration of the particular server.

19. The one or more non-transitory computer readable storage media of claim 7, wherein the instructions further cause the processor to determine that the load on the first data center exceeds the threshold by comparing a server load for each particular server in the first plurality of servers to a server load threshold corresponding to the particular server based on a configuration of the particular server.

20. The apparatus of claim 13, wherein the processor is further configured to determine that the load on the first data center exceeds the threshold by comparing a server load for each particular server in the first plurality of servers to a server load threshold corresponding to the particular server based on a configuration of the particular server.

\* \* \* \* \*